United States Patent
Mohan (10) Patent No.: US 11,184,961 B2
(45) Date of Patent: Nov. 23, 2021

(54) DEDICATED BIAS SUPPLY FOR RADIO COMMUNICATIONS IN LIGHT DRIVERS

(71) Applicant: ERP POWER, LLC, Moorpark, CA (US)

(72) Inventor: James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 0 days.

(21) Appl. No.: 16/911,186

(22) Filed: Jun. 24, 2020

(65) Prior Publication Data

US 2020/0413499 A1 Dec. 31, 2020

Related U.S. Application Data

(60) Provisional application No. 62/867,678, filed on Jun. 27, 2019.

(51) Int. Cl.
| | |
|---|---|
| *H05B 41/24* | (2006.01) |
| *H04B 1/04* | (2006.01) |
| *H05B 45/37* | (2020.01) |

(52) U.S. Cl.
CPC .............. *H05B 41/24* (2013.01); *H04B 1/04* (2013.01); *H05B 45/37* (2020.01); *H04B 2001/0408* (2013.01)

(58) Field of Classification Search
CPC .. H04B 1/04; H04B 2001/0408; H05B 41/24; H05B 45/37; H05B 45/382; H05B 47/19
USPC ........................................................ 315/284
See application file for complete search history.

(56) References Cited

U.S. PATENT DOCUMENTS

| | | | | |
|---|---|---|---|---|
| 4,081,722 A * | 3/1978 | Haferl | .................... | H04N 3/233 315/393 |
| 8,937,435 B1 * | 1/2015 | Sutardja | ............... | H05B 45/382 315/219 |
| 2008/0042588 A1 * | 2/2008 | Chan | .................. | H05B 41/3921 315/224 |
| 2009/0097291 A1 * | 4/2009 | Bormann | .......... | H02M 3/33561 363/126 |
| 2013/0057167 A1 * | 3/2013 | Angeles | ............. | H05B 45/3725 315/200 R |
| 2013/0181624 A1 * | 7/2013 | Kang | ................... | H05B 45/382 315/200 R |
| 2013/0221875 A1 * | 8/2013 | Liao | ....................... | H05B 45/10 315/307 |
| 2013/0242620 A1 * | 9/2013 | Hosotani | ............... | H02M 3/337 363/21.09 |
| 2014/0063857 A1 * | 3/2014 | Peng | ................. | H02M 3/33507 363/16 |
| 2014/0246992 A1 * | 9/2014 | Chandupatla | ........... | H02M 1/36 315/307 |

(Continued)

*Primary Examiner* — Don P Le
(74) *Attorney, Agent, or Firm* — Lewis Roca Rothgerber Christie LLP (57) ABSTRACT

A power supply system for driving a light source includes a transformer including a primary winding and a plurality of secondary windings including an output bias winding, a control bias winding, and an RF bias winding, the output bias winding being electrically coupled to and configured to supply electrical power to the light source, a control circuit electrically coupled to and configured to receive electrical power from the control bias winding; and an RF communication circuit electrically coupled to and configured to receive electrical power from the RF bias winding.

15 Claims, 4 Drawing Sheets

(56) References Cited

U.S. PATENT DOCUMENTS

| | | | |
|---|---|---|---|
| 2014/0346874 A1* | 11/2014 | Fang | H05B 45/375 |
| | | | 307/31 |
| 2014/0361690 A1* | 12/2014 | Yamada | H01J 37/32155 |
| | | | 315/111.21 |
| 2015/0296598 A1* | 10/2015 | Haid | H05B 45/56 |
| | | | 315/291 |
| 2015/0334800 A1* | 11/2015 | Fawaz | H05B 45/3725 |
| | | | 315/294 |
| 2018/0192496 A1* | 7/2018 | Stewart | H05B 45/385 |
| 2020/0413499 A1* | 12/2020 | Mohan | H05B 41/24 |

* cited by examiner

DEDICATED BIAS SUPPLY FOR RADIO COMMUNICATIONS IN LIGHT DRIVERS

CROSS-REFERENCE TO RELATED APPLICATION(S)

This application claims priority to, and the benefit of, U.S. Provisional Application No. 62/867,678 ("DEDICATED BIAS SUPPLY FOR RADIO COMMUNICATIONS IN LED DRIVERS"), filed on Jun. 27, 2019, the entire content of which is incorporated herein by reference.

FIELD

Aspects of the present invention are related to power supply systems for driving light sources.

BACKGROUND

As energy conservation and environment protection are a growing concern, the use of light emitting diodes (LEDs) in various lighting applications has emerged as one potential solution for addressing these concerns. Generally, LED light sources are energy efficient and durable, and have a long life. Since controllable lighting can not only conserve energy, but also improve users' experiences in various spaces and settings, wireless lighting control is becoming an ever more desirable feature. Wireless LED drivers allow users to wirelessly control dimming, scheduling, and ambient scenes with the swipe of a user's finger or the sound of the user's voice.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a power supply system for driving a light source that has a dedicated power feed for an integrated RF communications module. According to some embodiments, the integrated RF communication module is powered through a dedicated bias winding that is electrically isolated from the secondary-side controller of the power supply system, and thus, the control loop of the power supply system is unaffected by the transient current draws of the RF communication module. As such, the power supply system according to some embodiments eliminates or substantially reduces any visible flicker or shimmer in the output light resulting from the operation of the tightly integrated RF communication module, and it provides a low-power stand-by mode even when wirelessly communicating via the RF communication module.

According to some embodiments of the present disclosure, there is provided a power supply system for driving a light source, the power supply system including: a transformer including a primary winding and a plurality of secondary windings including an output bias winding, a control bias winding, and an RF bias winding, the output bias winding being electrically coupled to and configured to supply electrical power to the light source; a control circuit electrically coupled to and configured to receive electrical power from the control bias winding; and an RF communication circuit electrically coupled to and configured to receive electrical power from the RF bias winding.

In some embodiments, the control and RF bias windings are configured to isolate the control circuit from transient bias currents of the RF communication circuit.

In some embodiments, the RF bias winding is electrically isolated from the control bias winding and the output bias winding.

In some embodiments, an inductive coupling of the RF bias winding to the primary winding is greater than that of the control bias winding to the primary winding.

In some embodiments, the primary winding is at a first physical layer, the RF bias winding is at a second physical layer, and the control bias winding is at a third physical layer, the second physical layer being between the first and third physical layers.

In some embodiments, a voltage provided by the control bias winding is greater than a voltage provided by the RF bias winding.

In some embodiments, the power supply system further includes: a power factor correction (PFC) circuit configured to provide an input voltage to the primary winding of the transformer.

In some embodiments, the control circuit is configured to control the PFC circuit based on a light setting and a drive voltage and a drive current of the output bias winding.

In some embodiments, the control circuit includes: a regulation controller 72 configured to receive a light setting from the RF communication circuit and to generate a control reference signal corresponding to the light setting; and a first regulator configured to receive electrical power from the control bias winding and to supply a first regulated voltage to the regulation controller.

In some embodiments, the control circuit further includes: an operational amplifier configured to sense a drive voltage or a drive current of the output bias winding and to compare the sensed drive voltage or drive current to the control reference signal from the regulation controller to generate a power control signal for controlling the PFC circuit; and a second regulator configured to receive electrical power from the control bias winding and to supply a second regulated voltage to the operational amplifier.

In some embodiments, the power supply system further includes: a cross-barrier coupler configured to communicate the power control signal to a power factor correction (PFC) circuit at a primary side of the transformer.

In some embodiments, a voltage provided by the control bias winding is 12.5 V to 30 V, and the first regulated voltage is 1.8 V to 3.3 V, and the second regulated voltage is 12 V to 24 V.

In some embodiments, the RF communication circuit includes: an RF transceiver configured to wirelessly receive a light setting and to generate a signal corresponding to the light setting for transmission to the control circuit; and a second voltage regulator configured to receive electrical power from the RF bias winding and to supply a second regulated voltage to the RF transceiver.

In some embodiments, the light setting includes an on/off setting or a dimmer level setting.

In some embodiments, the second voltage regulator is a linear regulator configured to regulate a variable voltage of 3.5 V to 5 V received from the RF bias winding, and the second regulated voltage is 1.8 V to 3.3 V.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of power supply system for driving a light source, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of embodiments of the present invention provide a separate dedicated bias winding, strictly for the wireless communication module, in order to prevent noise from influencing the rest of the power supply system, which may otherwise show up as flickering or shimmer in the light output.

According to some embodiments, the power supply system for driving a light source (e.g., one or more light emitting diodes (LEDs)) allows tightly integrated RF communications within a compact driver, while eliminating or substantially reducing the risk that visible flicker or shimmer will be present when integrating RF communications into the driver. In some embodiments, the compact power supply system also offers low stand-by power when using an RF communications module. According to some embodiments, the power supply system not only feeds the RF communications module with its own dedicated voltage regulator, but also its own separate bias winding. This shifts the bias current transients away from the windings shared by the regulation control circuits, onto a winding whose sole function is to feed the RF communication module.

Figure 1:
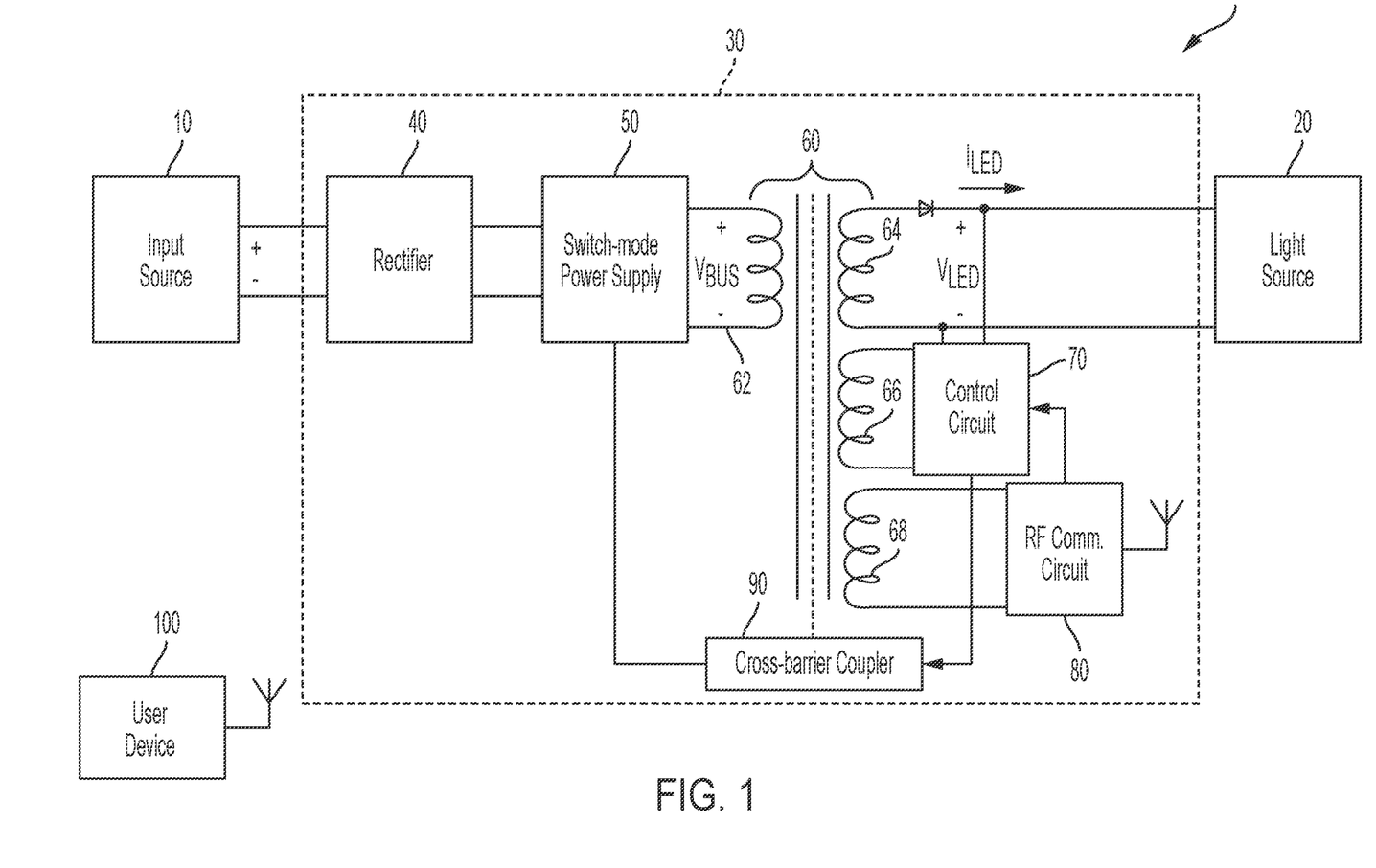
FIG. 1 illustrates a lighting system including a power supply system having an independent power feed for an RF communications circuit, according to some example embodiments of the present disclosure.

FIG. 1 illustrates a lighting system 1 including a power supply system 30 having an independent power feed for an RF communications circuit 80, according to some example embodiments of the present disclosure.

According to some embodiments, the lighting system 1 includes an input source 10, a light source 20, and a power supply system 30 (e.g., a light source driver) for powering and controlling the brightness of the light source 20 based on the signal from the input source 10.

The input source 10 may include an alternating current (AC) power source that may operate at, for example, 120 Vac (e.g., in the US) or 240 Vac (e.g., in Europe). The light source 20 may include one or more light-emitting-diodes (LEDs) or an arc or gas discharge lamp with electronic ballasts, such as high intensity discharge (HID) or fluorescent lights.

In some embodiments, the power supply system 30 (also referred to as a light source driver) includes a rectifier 40, and a switch-mode power supply 50, a transformer 60, a control circuit 70, an RF communication circuit 80, and a cross-barrier coupler (e.g., a galvanically isolated cross-barrier coupler) 90. The rectifier 40 provides a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The switched-mode power supply 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal (e.g., $V_{LED}$), and when the light source 20 requires constant voltage, the drive signal may be a variable current signal (e.g., $I_{LED}$). In some embodiments, a PFC circuit within the switched-mode power supply 50 includes a boost converter for maintaining (or attempting to maintain) a constant (or substantially constant) DC bus voltage $V_{BUS}$ on its output while drawing a current that is in phase with and at the same frequency as the line voltage.

The switched-mode power supply 50 may also improve (e.g., increase) the power factor of the load on the input source 10 and reduce the total harmonic distortions (THD) of the power supply system 30. As non-linear loads, such as the rectifier 40 and the transformer 60, input filter capacitors, input filter chokes, the main switch and inductor of the boost converter, and/or the like, distort the current drawn from the input source 10, the PFC circuit within the switched-mode power supply 50 counteracts the distortion and raises the power factor. However, embodiments of the present disclosure are not limited to switched-mode power supplies with active power factor correction, and the switched-mode power supply 50 may not perform any power factor correction.

According to some embodiments, the transformer 60 is a single-phase, multi-winding transformer that includes a primary winding 62 on a primary side of the transformer and a plurality of secondary windings on a secondary side of the transformer. The secondary windings include an output bias winding 64, a control bias winding 66, and an RF bias winding 68. In some embodiments, the secondary windings 64, 66, and 68 are electrically isolated from each other and the primary winding 62. The output bias winding 64 is electrically coupled to, and is configured to supply electrical power to, the light source 20. The control bias winding 66 is electrically coupled to, and is configured to supply electrical power to, the control circuit 70. The RF bias winding 68 is electrically coupled to, and is configured to supply electrical power to, the RF communication circuit 80.

The control circuit 70 monitors the output/drive current $I_{LED}$ and the output/drive voltage $V_{LED}$ provided to the light source 20 by the output bias winding 64 and sends a power control signal to the switched-mode power supply 50, via the cross-barrier coupler 90, to increase or decrease the bus voltage $V_{BUS}$, or modulate an inverter circuit in a multi-stage switch-mode power supply, to achieve a desired brightness at the light source.

The RF communication circuit 80 is in wireless communication with a user device 100 (e.g., a mobile device, such as a smart phone or tablet) and receives the desired light setting (e.g., on/off and/or dimmer level) from the user device 100 and communicates the light setting to the control circuit 70. The communication between the RF communication circuit 80 and the user device 100 may be enabled by any suitable wireless communication technology, such as wifi, bluetooth, etc.

The cross-barrier coupler 90 may include an optocoupler that enables the communication of a power control signal from the control circuit 70, which is on the secondary side of the transformer 60, to the switched-mode power supply 50, which is on the primary side of the transformer 60, while maintaining the electrical isolation between the primary and secondary sides. In some examples, the cross-barrier coupler 90 may also include bias control for the optocoupler and filter capacitors at its input and/or output to ensure clean signals. This control signal may influence the operation of the switched-mode power supply 50 (e.g., influence the on/off times of the main switch in the boost converter), which determines the drive voltage/current $V_{LED}/I_{LED}$ delivered to the light source 20.

Figure 2:
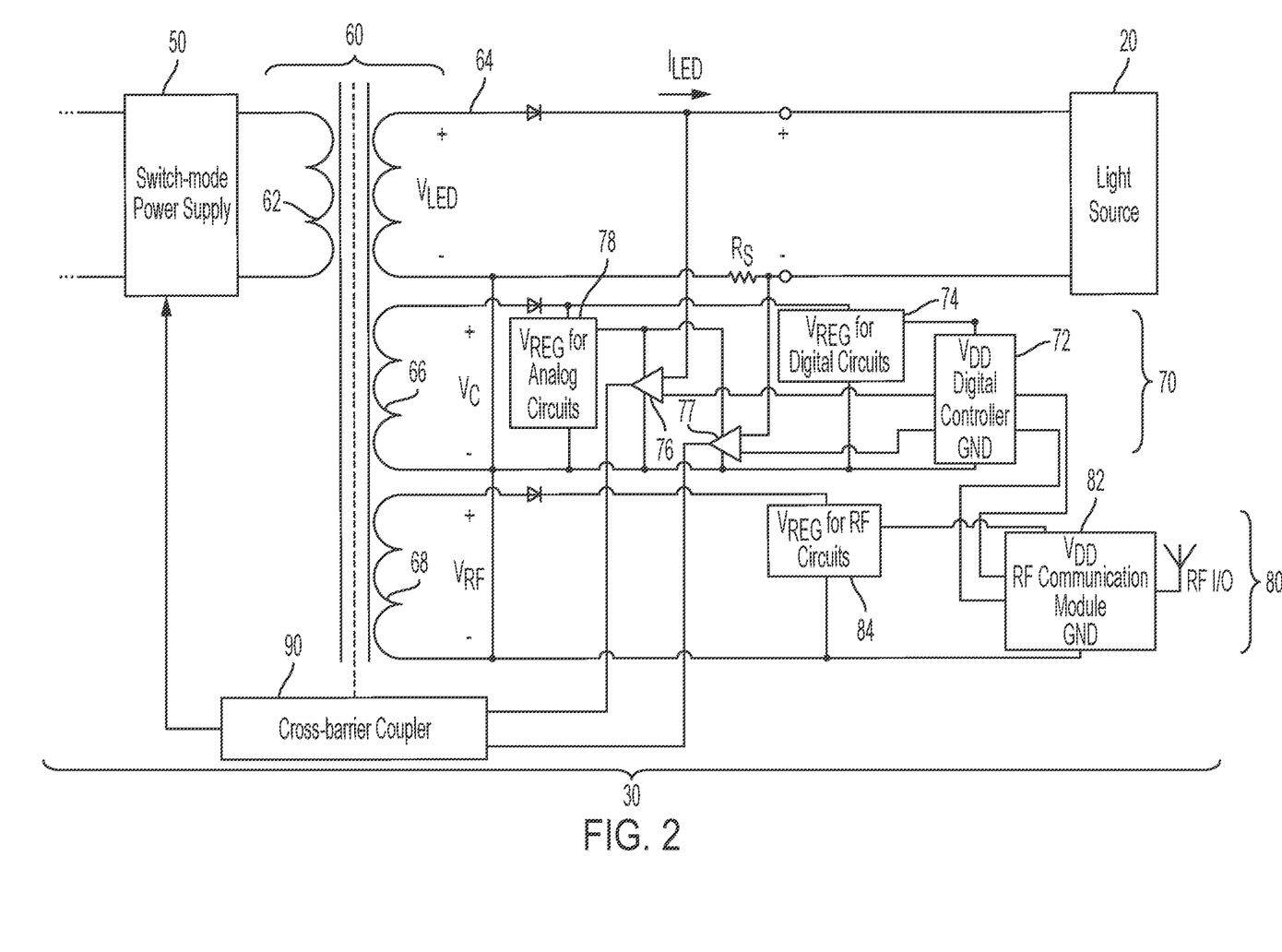
FIG. 2 is a schematic diagram of a portion of the power supply system, according to some embodiments of the present disclosure.

FIG. 2 is a schematic diagram of a portion of the power supply system, according to some embodiments of the present disclosure.

According to some embodiments, the control circuit 70 includes a regulation controller (e.g., digital controller) 72, a first regulator 74, first and second operational amplifiers (e.g., first and second error amplifiers) 76 and 77, and a second regulator 78. The digital controller 72 receives the desired light setting from the RF communication circuit 80 and converts that to a voltage control signal (e.g., a voltage control reference signal) and a current control signal (e.g., a current control reference signal) which are transmitted to the first and second operational amplifiers 76 and 77. The first operational amplifier 76 compares a sensed drive voltage $V_{LED}$ to the voltage control signal to generate a voltage regulation control signal, and the second operational amplifier 77 compares a sensed drive current $I_{LED}$ (measured as a voltage across the sense resistor $R_S$) to the current control signal to generate a current regulation control signal. The cross-carrier communicates the voltage and current regulation control signals to the switched-mode power supply 50.

The first regulator 74 is configured to down-convert the voltage $V_C$ of the control bias winding 66, which may vary over time, to a regulated digital supply voltage VDD for powering the regulation controller 72. Similarly, the second regulator 78 is configured to down-convert the voltage $V_C$ of the control bias winding 66 to a regulated analog supply voltage for powering the first and second operational amplifiers 76 and 77. In some examples, the voltage $V_C$ of the unregulated control bias winding 66 may vary from about 12.5 V to about 30 V, the regulated analog supply voltage may be about 12 V to about 24 V, and the regulated digital supply voltage may be about 1.8 V to about 3.3 V.

While FIG. 2 illustrates the control circuit as having two operational amplifiers 76 and 77, embodiments of the present disclosure are not limited thereto. For example, the regulation controller 72 may sense the drive current $I_{LED}$ and drive voltage $V_{LED}$ directly and generate the voltage and current regulation control signals. In such examples, the first regulator 74 may be omitted and the regulation controller 72 may be electrically powered by the second regulator 78.

In some embodiments, the RF communication circuit 80 includes a transceiver (e.g., a bluetooth transceiver) 82 for communicating with the user device 100 and a third regulator 84 for converting the voltage $V_{RF}$ of the RF bias winding 68 to a regulated supply voltage for powering the transceiver 82. In some examples, the unregulated voltage $V_{RF}$ of the RF bias winding 68 may vary from about 3.5 V to about 5 V, and the regulated supply voltage may be about 1.8 V to about 3.3 V. In some examples, the first to third regulators may be any suitable regulators, such as linear voltage regulators (e.g., low-dropout regulators) or the like.

When the RF transceiver 82 is idle, it may enter a low-power state and draw little current; however, when receiving or transmitting data, the RF transceiver 82 may draw substantial current (e.g., 50 mA to 150 mA). These transient currents may be substantially higher than the current draw of the operational amplifiers 76 and 77 and the controller 72 when in normal operation mode. When the RF transceiver 82 is powered by the same bias winding 66 that powers the operational amplifiers 776 and 77, the surge in current during wireless communication would result in substantial power draw, as the voltage $V_C$ of the control bias winding 66 is much higher than the voltage needed to power the RF transceiver 82. However, by placing the RF transceiver 82 on a separate dedicated bias winding 68 and utilizing an independent regulator according to some embodiments, the number of windings may be adjusted to produce a lower overhead, i.e., a lower unregulated voltage $V_{RF}$ that is closer to the regulated supply voltage for powering the transceiver 82. As such, the power draw from the windings may be substantially reduced. In other words, separating the RF transceiver 82 from the bias winding 66 that feeds the operational amplifiers 76 and 77, and providing an independent winding and regulator for powering the RF transceiver 82 according to some embodiments can substantially improve power efficiency of the power supply system. For example, by separating the RF communication circuit 80 from the control circuit 70 and reducing the voltage overhead for the RF transceiver 82 may reduce the power consumption of the RF communication circuit 80 from about 0.5-1 W down to about 0.15-0.3 W. This reduction in power consumption makes it easier for the power supply system to comply with Energy Star and CLE agency certifications' power and watts-per-lumen efficacy targets.

Further, electrically isolating the RF transceiver 82 from the control circuit 70 can allow for the integration of the RF transceiver within the power supply system 30 without adversely affecting the light output of the light source 20.

Figure 3A:
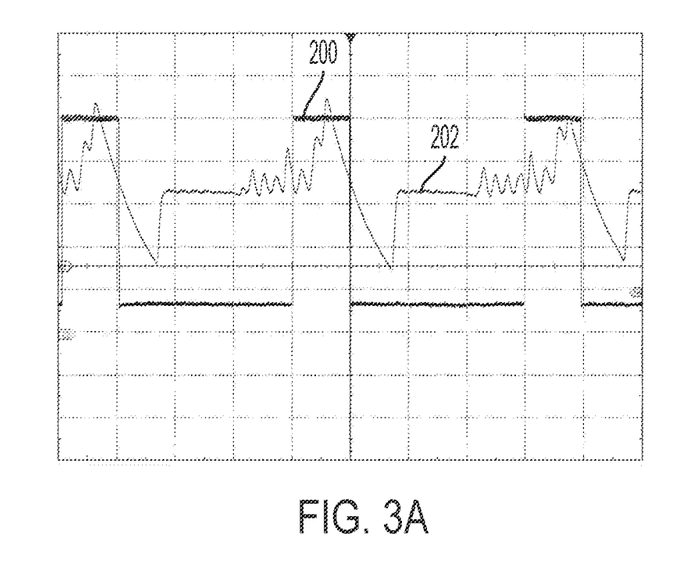
FIG. 3A illustrates the effects of RF transceiver current swings on the drive current of the light source when the RF transceiver shares a bias winding with the control circuit, according to some examples.
Figure 3B:
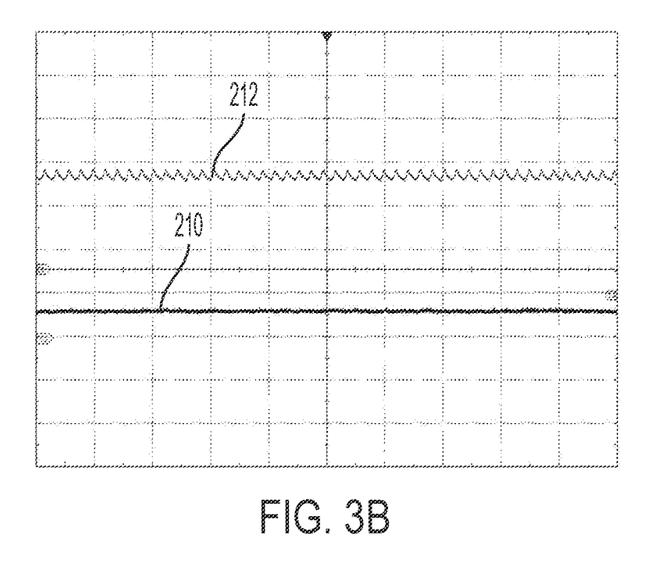
FIG. 3B illustrates the effects of RF transceiver current swings on the drive current of the light source when the RF transceiver is electrically isolated from the bias winding of the control circuit, according to some embodiments of the present disclosure.

FIG. 3A illustrates the effects of RF transceiver current swings on the drive current of the light source 20 when the RF transceiver 82 shares a bias winding with the control circuit, according to some examples. FIG. 3B illustrates the effects of RF transceiver current swings on the drive current of the light source 20 when the RF transceiver 82 is electrically isolated from the bias winding of the control circuit 70, according to some embodiments of the present disclosure.

Referring to FIG. 3A, when the RF transceiver 82 shares a common bias winding with the control circuit 70 (not shown), the wireless communication of the RF transceiver 82 may cause significant swings in the current 200 drawn by the bias winding. The sudden current draws may cause the outputs of the first and second regulators 74 and 78 to drop below the desired regulated outputs, which affects the outputs of the controller 72 and the operational amplifiers 76 and 77. This may be exacerbated when the light source 20 is off or at a low brightness level since the secondary windings of the transformer 60 will inherently be at low voltages, and the current transients may cause temporary dips in the output voltages of the regulators. This may cause the controller 72 and the operational amplifiers 76 and 77 to produce incorrect outputs and thus disrupt the control mechanism of the power supply system. The resulting distortions (e.g., ripples and steep rise or fall) in the drive current 202 of the light source 20 may lead to undesirable flickers and shimmers in the light output of the light source 20, which can be readily visible to the human eye.

Referring to FIG. 3B, because the RF communication circuit 80 is independently powered by the RF bias winding 68 and a dedicated regulator 84 according to some embodiments, it is electrically isolated from the control bias winding 66, which is coupled to the control circuit 70. As such, the control circuit 70 is isolated or substantially isolated from any noise resulting from the operation of the RF transceiver 82. In other words, the transient currents of the RF transceiver 82 do not affect the control operation of the control circuit 70, and thus do not result in visible flickers or shimmers. For example, as shown in FIG. 3B, the current 210 drawn by the control bias winding 66 is unaffected by the bias current transients of the RF bias winding 68, which in turn leads to normal operation of the power supply system. Therefore, despite the transient currents of the RF communication circuit 80, the drive current 212 of the light source 20 is absent of any distortions that would cause flicker or shimmer, even at low brightness/light levels. The very low amplitude saw-tooth visible in the drive current $I_{LED}$ 212 in FIG. 3B may be due to the control and regulatory system of the power supply system 30 that is attempting to constantly correct the drive current $I_{LED}$ to the light source 20.

Because the RF bias winding 68 provides a much lower feed voltage than the control bias winding 66, it has fewer windings than the control bias winding 66, which makes it easier to place the RF bias winding 68 physically closer to the primary winding 62 than the other windings. According to some embodiments, the inductive coupling (e.g., magnetic coupling) of the RF bias winding 68 to the primary winding 62 is greater than that of the control bias winding 66 to the primary winding 62. This increased coupling may further improve (e.g., increase) the isolation of the bias current transients of the RF bias winding 68 from the control circuit 70, which further reduces the potential for flickers/shimmers of the light output.

Figure 4:
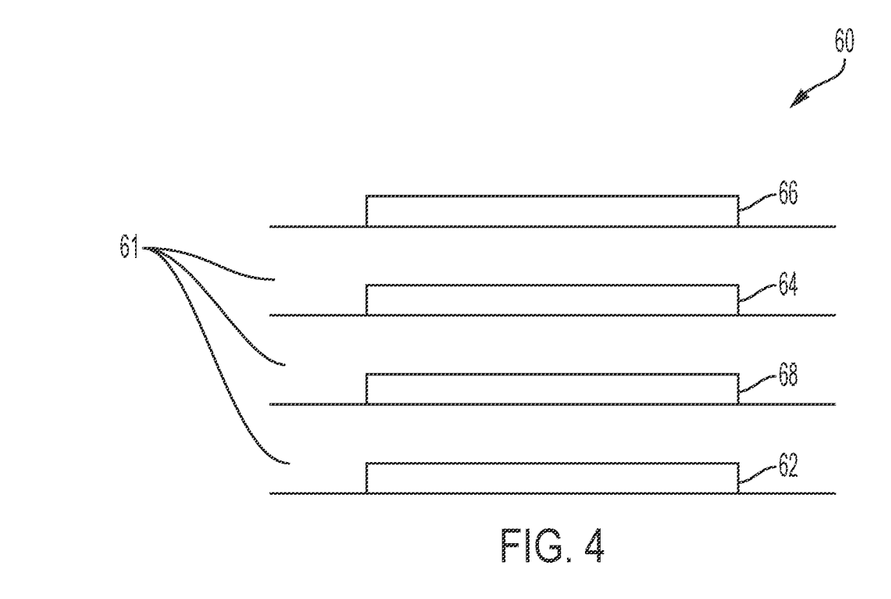
FIG. 4 is a cross-sectional view of a transformer of the power supply system according to some embodiments of the present disclosure.

FIG. 4 is a cross-sectional view of the transformer 60 according to some embodiments of the present disclosure.

In some embodiments, the transformer 60 is implemented with stacked parallel windings, where the primary winding 62 is at a first physical layer, the RF bias winding 68 is at a second physical layer, and the control bias winding 66 is at a third physical layer, in which the second physical layer is stacked between the first and third physical layers. Neighboring windings may be separated by insulating layers 61. As shown in FIG. 4, the output bias winding 64 may be stacked between the RF bias winding and the control bias winding 68; however, embodiments of the present disclosure are not limited thereto. For example, the output bias winding 64 may be positioned to be farthest away from primary winding 62, or below the primary winding 62 and the other secondary windings 66 and 68.

While FIG. 4 illustrates the primary winding 62 as being a single winding, embodiments of the present disclosure are not limited thereto. For example, the primary winding 62 may be split between first and second primary windings, and the secondary windings 64, 66, and 68 may be sandwiched therebetween. Such an arrangement may improve bias coupling but increase leakage inductance and yield slightly higher copper losses as one of the first and secondary primary windings would be spun around a larger inner diameter than the other.

Accordingly, as described herein, the power supply system allows for tight integration of RF communications within a compact light source driver. The power supply system with integrated RF communications module is capable of dimming to very low light levels without exhibiting visible flicker or shimmer in the light output even while the RF communications module is engaged in wireless communication. Further, the power supply system according to some embodiments has low quiescent power consumption even when operating the integrated RF communications module.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The power supply system with an independent power feed for the RF communications module and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the power supply system may be implemented on a flexible printed circuit film, a tape carrier package (TCP), a printed circuit board (PCB), or formed on the same substrate. Further, the various components of the power supply system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A power supply system for driving a light source, the power supply system comprising:
    a transformer including a primary winding and a plurality of secondary windings comprising an output bias winding, a control bias winding, and an RF bias winding, the output bias winding being electrically coupled to and configured to supply electrical power to the light source;
    a control circuit electrically coupled to, and configured to receive electrical power from, the control bias winding; and
    an RF communication circuit electrically coupled to, and configured to receive electrical power from, the RF bias winding, the output and RF bias windings being electrically isolated from one another.

2. The power supply system of claim 1, wherein the control and RF bias windings are configured to isolate the control circuit from transient bias currents of the RF communication circuit.

3. The power supply system of claim 1, wherein the RF bias winding is electrically isolated from the control bias winding.

4. The power supply system of claim 1, wherein an inductive coupling of the RF bias winding to the primary winding is greater than that of the control bias winding to the primary winding.

5. The power supply system of claim 1, wherein a voltage provided by the control bias winding is greater than a voltage provided by the RF bias winding.

6. The power supply system of claim 1, further comprising:
    a power factor correction (PFC) circuit configured to provide an input voltage to the primary winding of the transformer.

7. The power supply system of claim 6, wherein the control circuit is configured to control the PFC circuit based on a light setting and a drive voltage and a drive current of the output bias winding.

8. The power supply system of claim 1, wherein the RF communication circuit comprises:
    an RF transceiver configured to wirelessly receive a light setting and to generate a signal corresponding to the light setting for transmission to the control circuit; and
    a second voltage regulator configured to receive electrical power from the RF bias winding and to supply a second regulated voltage to the RF transceiver.

9. The power supply system of claim 8, wherein the light setting comprises an on/off setting or a dimmer level setting.

10. The power supply system of claim 8, wherein the second voltage regulator is a linear regulator configured to regulate a variable voltage of 3.5 V to 5 V received from the RF bias winding, and
    wherein the second regulated voltage is 1.8 V to 3.3 V.

11. A power supply system for driving a light source, the power supply system comprising:
    a transformer including a primary winding and a plurality of secondary windings comprising an output bias winding, a control bias winding, and an RF bias winding, the output bias winding being electrically coupled to and configured to supply electrical power to the light source;
    a control circuit electrically coupled to, and configured to receive electrical power from, the control bias winding; and
    an RF communication circuit electrically coupled to, and configured to receive electrical power from, the RF bias winding,
    wherein the primary winding is at a first physical layer, the RF bias winding is at a second physical layer, and the control bias winding is at a third physical layer, the second physical layer being between the first and third physical layers.

12. A power supply system for driving a light source, the power supply system comprising:
    a transformer including a primary winding and a plurality of secondary windings comprising an output bias winding, a control bias winding, and an RF bias winding, the output bias winding being electrically coupled to and configured to supply electrical power to the light source;
    a control circuit electrically coupled to, and configured to receive electrical power from, the control bias winding; and
    an RF communication circuit electrically coupled to, and configured to receive electrical power from, the RF bias winding,
    wherein the control circuit comprises:
    a regulation controller configured to receive a light setting from the RF communication circuit and to generate a control reference signal corresponding to the light setting; and a first regulator configured to receive electrical power from the control bias winding and to supply a first regulated voltage to the regulation controller.

13. The power supply system of claim 12, wherein the control circuit further comprises:

an operational amplifier configured to sense a drive voltage or a drive current of the output bias winding and to compare the drive voltage or the drive current to the control reference signal from the regulation controller to generate a power control signal for controlling a PFC circuit; and a second regulator configured to receive electrical power from the control bias winding and to supply a second regulated voltage to the operational amplifier.

14. The power supply system of claim 13, further comprising:

a cross-barrier coupler configured to communicate the power control signal to a power factor correction (PFC) circuit at a primary side of the transformer.

15. The power supply system of claim 13, wherein a voltage provided by the control bias winding is 12.5 V to 30 V, and wherein the first regulated voltage is 1.8 V to 3.3 V, and wherein the second regulated voltage is 12 V to 24 V.

* * * * *